Dec. 15, 1970  W. P. DEVEREUX  3,547,526

OPTICAL BEAM CROSS-SECTION CONVERTER

Filed Oct. 26, 1967  3 Sheets-Sheet 1

INVENTOR.
WILLIAM P. DEVEREUX
BY
OSTROLENK, FABER, GERB & SOFFEN
ATTORNEYS

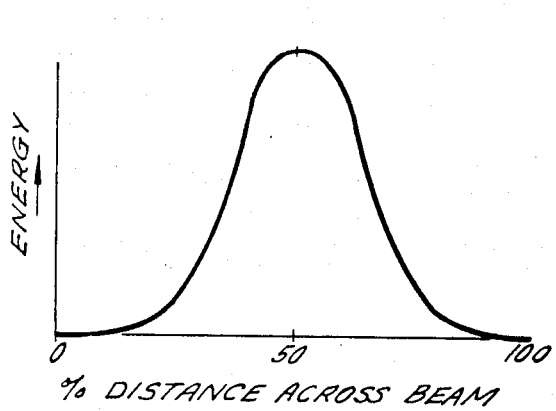
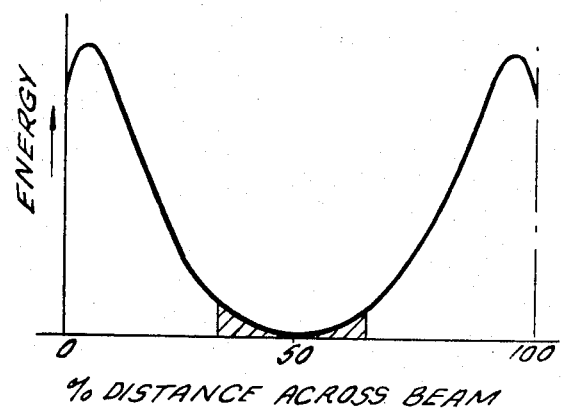
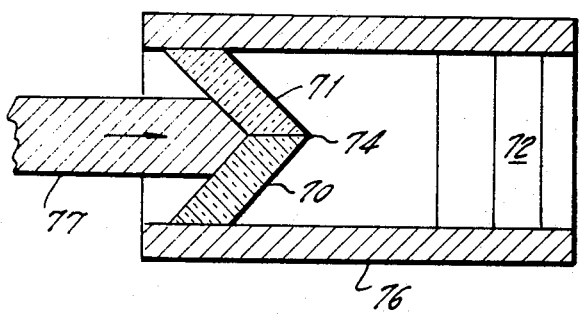
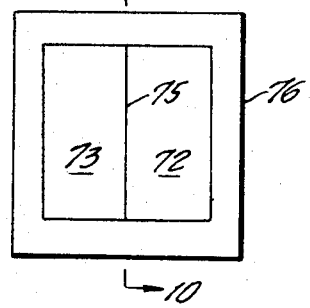
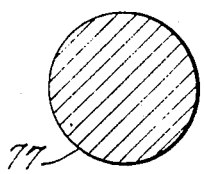
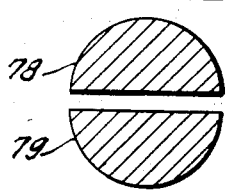
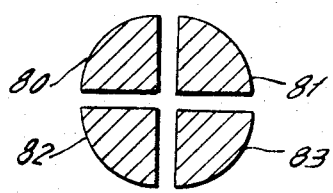
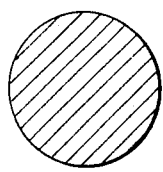
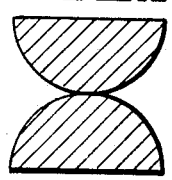
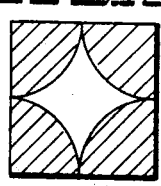

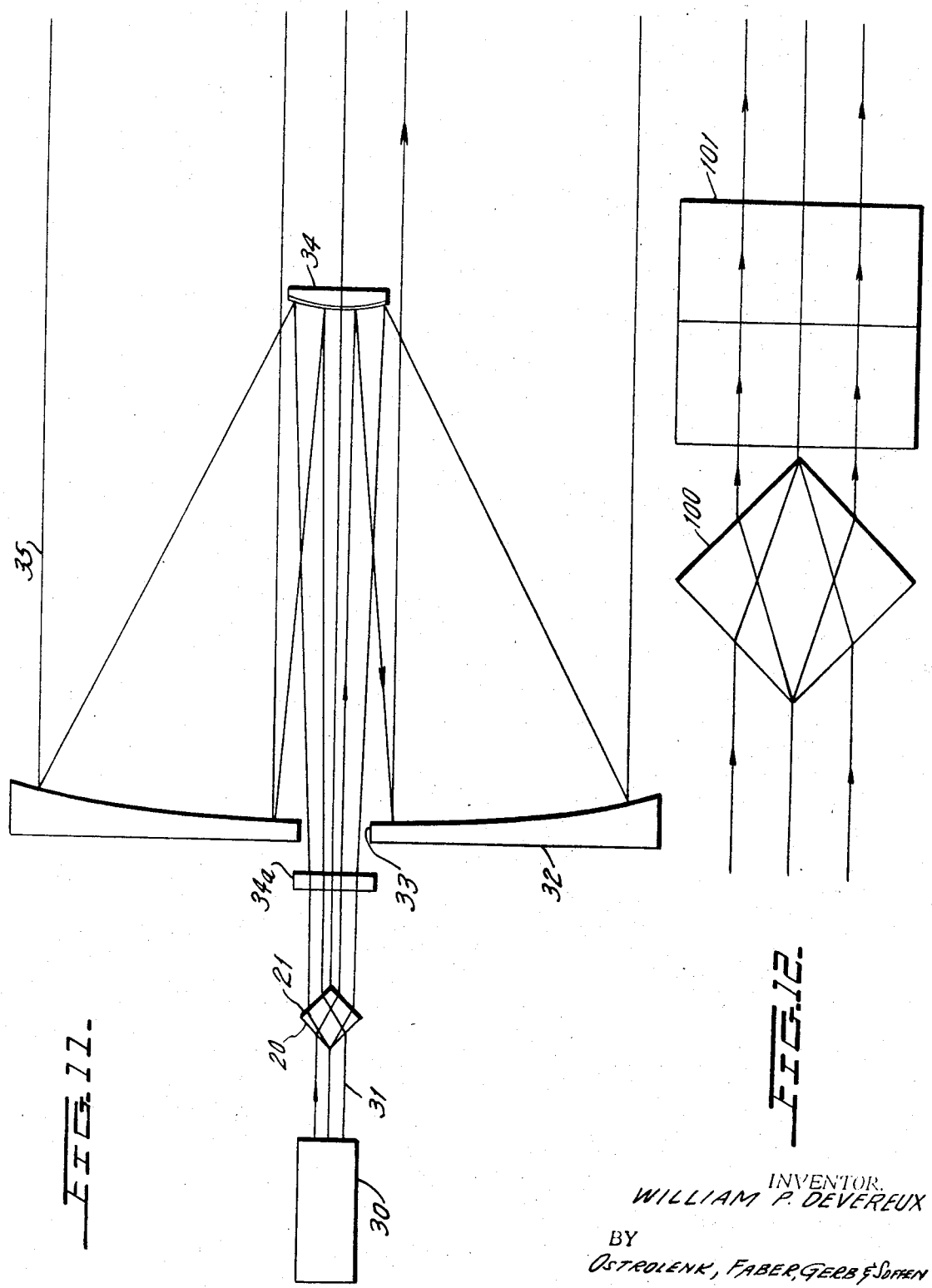

United States Patent Office 3,547,526
Patented Dec. 15, 1970

3,547,526
OPTICAL BEAM CROSS-SECTION CONVERTER
William P. Devereux, Syosset, N.Y., assignor to Kollsman Instrument Corporation, Syosset, N.Y., a corporation of New York
Filed Oct. 26, 1967, Ser. No. 678,245
Int. Cl. G02b 17/00
U.S. Cl. 350—200    5 Claims

ABSTRACT OF THE DISCLOSURE

A lens arrangement having one or more peripheral walls converging toward an apex and having an optical axis passing through the apex and coaxial with a beam of light having a solid cross-section. The lens refracts the light so that it takes the general form of a hollow tube after passing through the lens. The lens can be formed of cones or pyramids cemented together at their base, or can be a single dished cone or pyramid of constant thickness. Two rhombs may be cemented together in tented fashion which cooperate with an identical set of orthogonally disposed tented rhombs.

---

This invention relates to an optical lens and more particularly relates to a novel lens for altering the energy distribution across the area of a beam of light.

A beam of light which is to be sensed by a sensor or is to pass through certain other systems may have an energy distribution which is not well matched to the sensitivity distribution over the area of the sensor or other light handling systems. For example, the output beam of a gas laser has a Gaussian distribution of energy, with peak energy concentrated in the core of the beam with the energy tapering off toward the outer area of the beam. When this beam is operated upon by an antenna telescope of the reflecting type, the telescope will have a central obscuration caused by its secondary mirror and its resulting annular pupil. Thus, the central and richest part of the beam would be lost, and the efficiency of the beam transmitter would be seriously degraded.

In accordance with the present invention, a novel lens is provided which will convert a solid cross-section beam of light to a hollow tube. Thus, the high energy core of a laser beam is radially displaced so that, when using the above-noted type of antenna telescope, the central obscuration falls within the light-free interior diameter of the newly formed light tube.

The novel lens of the invention is formed generally of a shape having one or more walls which converge toward an apex, with the optical axis of the lens being coaxial with the optical axis of the light beam. The remainder of the lens system acts to refract the solid tube radially outwardly from its center and into a hollow tubular light beam coaxial with the incident solid cross-section beam. The lens could be formed in various manners in accordance with the invention, and could take the form of cones or prisms cemented base-to-base; a single dished cone or dished pyramid of constant thickness, or pairs of flat rhombs, at angles to one another and connected at an apex with two pairs orthogonally related to one another.

It is, therefore, a primary object of this invention to increase the efficiency of a light beam transmitting system.

Another object of this invention is to provide a novel lens for redistributing the energy of a beam of light from a solid cross-section to a hollow tube.

These and other objects of this invention will become apparent from the following description when taken in connection with the drawings in which:

FIG. 3 shows the energy distribution of a gas laser beam of light.

FIG. 4 shows the energy distribution of a gas laser beam after passing through the device illustrated in FIG. 1.

FIG. 9 shows a front view of a further embodiment of the invention, using cemented flat rhombs.

FIG. 10 is a cross-section of FIG. 9 taken across section line 10—10 in FIG. 9.

FIGS. 10a, 10b and 10c show the development of the final beam cross-section, when using the structure of FIG. 10.

Figure 1:
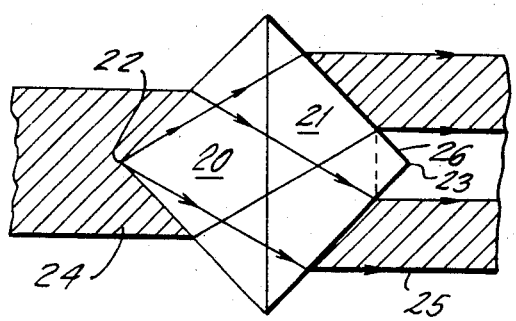
FIG. 1 shows a side view of a first embodiment of the invention, using two cones, cemented base-to-base, with the light beams shown by cross-hatching.

FIG. 11 schematically shows the lens of FIG. 1 when used in combination with a Cassegrain-type system.

FIG. 12 shows a further embodiment of the invention using two parallelepipeds.

FIG. 13 illustrates the shape of the entrance beam in FIG. 12.

FIG. 14 illustrates the shape of the beam after passing through the first parallelepiped.

FIG. 15 shows the shape of the beam after passing through the second parallelepiped.

Figure 2:
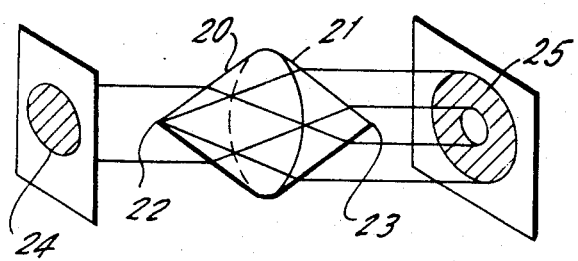
FIG. 2 shows the lens of FIG. 1 in perspective in connection with screens to illustrate the cross-section configuration of the beams.

Referring first to FIGS. 1 and 2, there is illustrated two solid cones 20 and 21 of any suitable optical glass, or other refractive material, which have respective apices 22 and 23 with their bases cemented together by a suitable optical cement. The lens system formed by cones 20 and 21 has an optical axis defined by a line joining apices 22 and 23, with this axis being coaxial with the optical axis of a solid light beam 24. Light beam 24, which is generated from any desired collimated source is incident on apex 22, and the ray trace shown illustrates that the solid circular beam 24 is refracted into a hollow output beam 25 by the two cones 20 and 21. It is to be noted that the unused tip 26 of one cone 21 can be cut away along the dotted line in FIG. 1.

For a typical system, the cones may have base diameters of 2.0 inches and altitudes of 1.0 inch, and indices of refraction of 1.581. Such a system would expand a solid beam having a diameter of 0.667 inch into a hollow tube having an outer diameter of 1.000 inch and an inner diameter of 0.333 inch. The portions of the cone at a radius of greater than 0.50 inch can be removed, resulting in a cylindrical element with conical tips.

Obviously, other dimensions could be chosen for a particular application. Moreover, it may be useful in some applications to form the two cones of different relative indices of refraction and/or different relative dimensions, or to have the central cylindrical section of a material with different refractive index.

FIG. 3 shows the energy distribution of the solid beam 24 of FIGS. 1 and 2 where the source is a gas laser. Note that there is a heavy concentration of energy in the center of the beam. FIG. 4 shows the energy distribution of the beam after modification by the double cone lens in preparation for transmission by a Cassegrain-type system. Examination of FIG. 4 shows that there is little energy left in the central ⅓ of beam which will be obscured by the secondary mirror. In accordance with the invention, the central third of the distribution shown in FIG. 4 is obscured rather than the central third of the distribution shown in FIG. 3.

FIG. 11 shows a typical application of the lens to transform the beam of the laser to make it compatible with antenna telescopes with central obscuration.

Referring to FIG. 11, there is shown a laser light source 30 which generates a solid beam 31 having the characteristics of FIG. 3. In order to direct the laser beam toward a target, a Cassegrain-type telescope is used. The system includes reflecting mirror 32 having an aperture 33, secondary mirror 34, and an optical diverging element 34a which may be a lense with positive or negative dioptric power, or whose function may be supplied by suitable modifications in the beam conversion element 20, 21 or the secondary mirror 34. Output light is directed toward mirror 34 through opening 33. In the past, the central mirror 34 and the aperture 33 would intercept the central part of the beam reflected from mirror 32, resulting in a hole in the transmitted beam equal in cross-section to the size of mirror 34. Where the beam 31 is a laser beam, the problem is further aggravated, since the central portion of the beam contained the bulk of the beam energy. In accordance with the invention, however, prisms 20 and 21 of FIGS. 1 and 2 are interposed between source 30 and mirror 34 to convert the beam to the hollow tube 35 which, when expanded by the magnification properties of mirrors 34 and 32, is large enough to contain mirror 34 within the hollow center section. Thus, substantially all the energy of beam 31 can now be transmitted past the obscuring mirror 34.

The cones 20 and 21 of FIGS. 1, 2 and 11 could take many forms, as shown in FIGS. 5 to 10.

Figure 5:
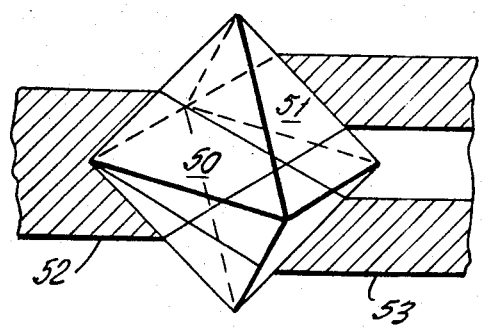
FIG. 5 shows a second embodiment of the invention, using two pyramids, cemented back-to-back.
Figure 6:
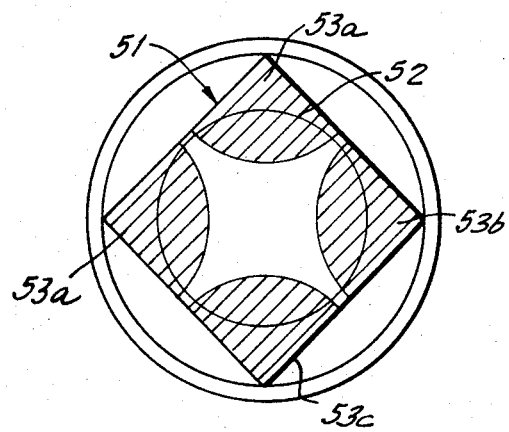
FIG. 6 is a cross-section of the output beam of the system of FIG. 5 showing the beam energy radially displaced into four spaced regions.

FIG. 5 shows the lens system comprised of two prisms 50 and 51 cemented together at their base to convert an incident solid beam of light 52 to a generally hollow tube 53. FIG. 6 shows the precise shape of hollow tube 53 in cross-section, as comprised of four spaced parallel sections 53a, 53b, 53c and 53d.

Figure 8:
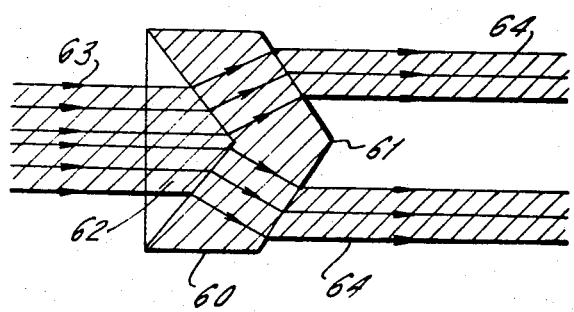
FIG. 8 is a cross-section of FIG. 7 taken on section line 8—8 in FIG. 7, and shows the beam configuration.
Figure 7:
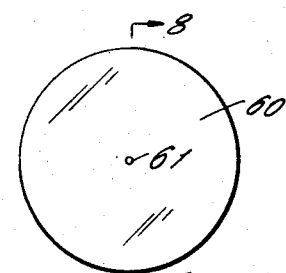
FIG. 7 shows a front view of a further embodiment of the invention comprising a single dished cone.

FIGS. 7 and 8 show a further version of the invention in which a single dished cone 60 has an apex 61, and a conical hollow 62, with the walls of the dished form having a constant thickness. As shown by the ray trace in FIG. 8, this arrangement will convert the solid beam 63 to a hollow tube 64 in the manner of the arrangement of FIGS. 1 and 2.

FIGS. 9 and 10 show a modification of FIGS. 7 and 8 which permit the device to be made of cemented flat rhombs which can be easily made. Four flat identical rhombs 70, 71, 72 and 73 are disposed in two pairs 70–71 and 72–73 in FIGS. 9 and 10. Each pair is cemented together to form a "tented" arrangement, as best shown for pair 70–71 having apices 74 and 75, respectively, which are perpendicular to one another. The pairs of rhombs are then spaced from one another within a suitable support housing 76. A circular continuous beam of light 77 (FIGS. 10 and 10a) incident on pair 70–71 will be separated in one plane into two sections 78 and 79, as shown in FIG. 10b. The segments 78 and 79 then fall on pair 72–73 where they are further divided into four separate sections 80, 81, 82 and 83, shown in FIG. 10c, thereby to define a generally hollow tube of light suitable for use with systems having the characteristics of central obscuration.

FIGS. 12 to 15 show a further embodiment of the invention consisting of a pair of cubes or parallelepipeds 100 and 101 which are displaced at 90° with respect to one another. More particularly, each of the two parallelepipeds 100 and 101 have central axes of symmetry which are perpendicular to the axis of incident light and are rotated by 90° with respect to one another. The construction of the parallelepipeds is relatively simple where each, if desired, could be formed of cemented prisms.

In operation, the entrance beam, which is incident upon the left-hand surfaces of parallelepiped 100 has the circular configuration shown in FIG. 13 which is converted to the spaced semicircular segments, as illustrated in FIG. 14, after the light passes through cube 100. When the light passes through the second parallelepiped 101, it is further converted to the shape shown in FIG 15 where, in accordance with the invention, the initial light in the input beam is so displaced as to form a generally hollow core region with the light energy radially displaced outwardly. It will be apparent that the material used in the configuration of parallelepipeds 100 and 101 can be of any desired glass or other refractive material for use with light in any portion of the spectrum, including the infrared, visible and ultraviolet regions.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. Beam transmitter apparatus, said apparatus comprising, in combination, means for generating a solid light beam and directing the same along an optical axis in a relationship wherein substantially all light energy of the solid light beam propagates parallel to said optical axis, a Cassegrainian telescope mounted along said optical axis to receive light energy of said beam and to transmit the same along said optical axis, said telescope including a primary reflecting mirror having an aperture opening concentric with said optical axis and a secondary reflecting mirror disposed along said optical axis to intercept the light energy passing through said aperture and redirect the same toward said primary reflection mirror to be redirected thereby parallel to said optical axis past said secondary reflecting mirror, and a refracting element positioned between the first-named means and said aperture for outwardly redistributing all of the light energy of the solid light beam to provide a hollow beam concentric with said optical axis and having substantially all light energy propagating parallel to said optical axis at the primary and secondary reflecting mirror locations to transmit said beam energy through the telescope substantially without attenuation.

2. Beam transmitter apparatus in accordance with claim 1 wherein said refracting element comprises a transparent body having an incident light surface receiving the light energy of said solid light beam into said body and an exit light surface through which said light energy exits from said body, said incident light surface and said exit light surface converging toward first and second apices, respectively, said incident light surface and said exit light surface being symmetrically disposed about a line extending between said first and said second spaced apices, said line being coaxial with said optical axis.

3. Beam transmitter apparatus in accordance with claim 2 wherein said body includes a pair of cones, and means mounting said cones together at their bases.

4. Beam transmitter apparatus in accordance with claim 2 wherein said body includes a pair of pyramid-shaped prisms, each having a generally square base, and means mouting said prisms together at their bases.

5. Beam transmitter apparatus in accordance with claim 1 wherein said refracting element comprises a pair of parallelepiped-shaped prisms, each having a pair of opposite corners intercepting and perpendicular to the optical axis, the axes of symmetry of said prisms being at an agle of about 90° with respect to each other.

(References on following page)

References Cited

UNITED STATES PATENTS

| | | | |
|---|---|---|---|
| 2,317,875 | 4/1943 | Atheg et al. | 350—202 |
| 2,642,775 | 6/1953 | Rooney | 350—89 |
| 2,881,654 | 4/1959 | Toffolo | 350—189 |
| 2,882,784 | 4/1959 | Toffolo | 350—189 |
| 3,419,321 | 12/1968 | Barber et al. | 350—189 |

FOREIGN PATENTS

| | | | |
|---|---|---|---|
| 279,733 | 1930 | Italy | 350—287 |
| 435,222 | 9/1935 | Great Britain | 350—170 |

M. J. TOKAR Assistant Examiner

U.S. Cl. X.R.

350—189, 204, 286